United States Patent Office 3,721,634
Patented Mar. 20, 1973

3,721,634
POLYMERIZATION PROCESS
John Versnel, Plainsboro, N.J., assignor to Cities Service Company, New York, N.Y.
No Drawing. Filed July 30, 1971, Ser. No. 167,800
Int. Cl. C08j 1/26
U.S. Cl. 260—2.5 FP
10 Claims

ABSTRACT OF THE DISCLOSURE

Metallic iron is used as an ingredient of the polymerization recipe to improve the melt flow of a polymer, prepared by polymerizing at least one vinylidene monomer, e.g., styrene, in the presence of a halogenated flame retardant. A preferred embodiment of the invention is the improvement of the melt flow of a foamable polymer prepared by suspension polymerization, with the consequent improvement of the dimensional stability of a self-extinguishing foam prepared therefrom.

BACKGROUND OF THE INVENTION

Field of the invention

This invention relates to a process for polymerizing vinylidene monomers in the presence of halogenated flame retardants and more particularly relates to a method of improving the melt flow of polymers thus prepared.

Description of the prior art

It is known to prepare self-extinguishing polymers by polymerizing one or more vinylidene monomers in the presence of a halogenated flame retardant. As disclosed, for example, in U.S. Pats. 3,093,599 and 3,326,832, the polymerization is conveniently conducted by a suspension technique, particularly when foamable polymers are desired. It has been found, however, that the presence of a halogenated flame retardant during the polymerization tends to increase the melt index of the polymer. This is particularly disadvantageous when the polymer is to be foamed, because the dimensional stability of the foam is adversely affected when the polymer has a high melt index.

SUMMARY OF THE INVENTION

An object of this invention is to provide a novel process for preparing self-extinguishing vinylidene polymers.

Another object is to provide a process for improving the melt flow of a polymer prepared by polymerizing a vinylidene monomer in the presence of a halogenated flame retardant.

A further object is to provide a process for improving the dimensional stability of a foam prepared from a polymer which has been obtained by polymerizing a vinylidene monomer in the presence of a halogenated flame retardant.

These and other objects are attained by polymerizing at least one vinylidene monomer in the presence of a halogenated flame retardant and 0.001–2%, based on the weight of the monomer, of finely-divided metallic iron. When a foam is desired, a volatile blowing agent may be incorporated before, during and/or after polymerization; and the product may be expanded by conventional means, advantageously by heating it to form a prefoam and treating the prefoam with steam in a mold to form a shaped article.

DESCRIPTION OF THE PREFERRED EMBODIMENTS

The present invention is a modification of known processes for polymerizing vinylidene monomers in the presence of halogenated flame retardants. In these processes the vinylidene monomers are usually olefins such as ethylene, propylene, etc.; vinyl or vinylidene halides such as vinyl or vinylidene chloride, etc.; vinyl esters such as vinyl acetate, etc.; alkyl (meth)acrylates such as methyl, ethyl, propyl, and butyl acrylates and the corresponding alkyl methacrylates, etc.; vinyl or vinylidene cyanides such as acrylonitrile, methacrylonitrile, ethacrylonitrile, propacrylonitrile, butacrylonitrile, etc.; vinylidene aromatic hydrocarbons such as styrene, alpha-methylstyrene, o-, m-, and p-methylstyrenes, 2,4-dimethylstyrene, p-butylstyrene, vinyl naphthalene, etc.; ar-halo vinylidene aromatic hydrocarbons such as o-, m-, and p-chlorostyrenes, o-, m-, and p-bromostyrenes, 2,4-dibromostyrene, 2-chloro-4-methylstyrene, etc.; and mixtures thereof.

These monomers may have a rubber dissolved therein, suitably a diene rubber such as polybutadiene, polyisoprene, and copolymers of conjugated dienes with one another or with one or more copolymerizable monovinylidene compounds such as styrene, acrylonitrile, methyl methacrylate, etc. Other rubbers which may be used are chlorinated polyolefins, acrylate rubbers, and the so-called EPT rubbers, which are essentially terpolymers of ethylene, propylene, and a polyunsaturated comonomer such as a non-conjugated diene.

A preferred embodiment of the invention is its application to those processes wherein the vinylidene monomer is one or more vinylidene aromatic hydrocarbons, alone or with up to an equal amount by weight of a copolymerizable monomer, and optionally having up to about 20% by weight of a rubber dissolved therein.

The halogenated flame retardants employed in the process are usually bromine compounds, although chlorine compounds and compounds containing both bromine and chlorine are also used. Exemplary of such flame retardants are aliphatic compounds such as chlorinated paraffins, tetrabromobutane, tris(2,3 - dibromopropyl) phosphate, chlorinated or brominated open-chain polymers of butadiene or isoprene having a degree of polymerization of 2–2000, etc.; aromatic compounds such as chlorinated diphenyl, dibromoethylbenzene, hexabromobenzene, bromophenyl allyl ethers, etc.; cyclic compounds such as the 2:1 and 1:1 Diels-Alder adducts of hexachlorocyclopentadiene and dibromocyclooctane, the chlorinated or brominated cyclic polymers of butadiene or isoprene, e.g.,
tetrabromocyclooctane,
dibromoethyldibromocyclohexane,
hexabromocyclododecane,
hexachlorocyclododecane, etc.

Such compounds are usually employed in amounts of about 0.5–10%, preferably about 1–5%, based on the weight of monomer.

A preferred embodiment of the invention is its application to processes wherein the flame retardant is a liquid or a solid melting below 150° C. According to a particularly preferred embodiment of the invention, the flame retardant is a brominated polymer of butadiene or isoprene having a degree of polymerization of 2–2000, especially a brominated cyclic dimer or trimer of butadiene.

The melt index depressor of the invention is metallic iron, which is preferably employed in finely-divided form to increase its efficiency. Metallic iron must be used per se, because it has been found that iron compounds are not equivalent thereto in the process. Ordinarily the amount of iron employed is about 0.001–2%, preferably about 0.015–1.5%, most preferably about 0.03–0.06%, based on the weight of monomer.

Except for the novel feature of utilizing metallic iron, the process of the invention is conducted by conventional polymerization techniques, e.g., mass, emulsion, or suspension, and utilizes the polymerization adjuvants normally used in such processes. Thus, when the polymerization is conducted by the preferred suspension polymerization technique, the monomer is polymerized with agitation in the presence of catalytic amounts of a free radical polymerization initiator such as a peroxy or azo compound, e.g., benzoyl peroxide, di-t-butyl peroxide, diisopropylbenzene peroxide, t-butyl peracetate, t-butyl percrotonate, t-butyl perbenzoate, azobisisobutyronitrile, etc., and a suspending agent such as a polyvinyl alcohol, a cellulose ether, a sulfonated polystyrene, a (meth)acrylic acid/alkyl (meth)acrylate interpolymer, tricalcium phosphate, etc., at temperatures of about 30–200° C., preferably about 50–150° C., under atmospheric or superatmospheric pressure. The amount of water employed is such that the water/monomer weight ratio is in the range of 9:1 to 2:3. If desired, the reaction mixture may contain optional ingredients such as chain transfer agents, water-soluble inorganic salts, etc.

When foamable polymers are desired, a blowing agent is incorporated before, during and/or after polymerization. The incorporation of the blowing agent is facilitated when it is incorporated early enough so that at least the final stage of the polymerization, e.g., at least the last 2% of the polymerization, is conducted in the presence of the blowing agent. The blowing agent may be a normally gaseous material but is preferably a low-boiling liquid that volatilizes on heating. Exemplary of suitable volatile blowing agents are lower aliphatic hydrocarbons such as the butanes, pentanes, hexanes, cyclopentane, cyclohexane, etc.; lower alkyl halides such as methyl chloride, trichloromethane, 1,2-dichlorotetrafluoroethane, etc. The amount of blowing agent used is usually in the range of about 2–15% based on the weight of monomer.

After completion of the polymerization, the polymer may be recovered by conventional techniques. When the polymer is to be used in preparing foam, it is frequently convenient to use the conventional prefoam/foam technique wherein foamable particles are heated with steam or hot air to form a prefoam, which is subsequently treated with steam in a mold to form a shaped article.

The particular advantage of the process is that the metallic iron counteracts the deleterious effect of the halogenated flame retardant on the melt index of the polymer and permits the formation of polymers having melt indices lower than 20, frequently less than 10, grams/10 minutes at 200° C. and 5 kg.

The following examples are given to illustrate the invention and are not intended as a limitation thereof. Unless otherwise specified, quantities mentioned are quantities by weight.

CONTROL A

Charge a suitable reaction vessel with 70 parts of water, 0.12 part of polyvinyl alcohol, 63 parts of styrene, one part of tetrabromocyclooctane, 0.14 part of benzoyl peroxide, and 0.02 part of t-butyl percrotonate. Heat the reaction mixture at 90–95° C. until hard beads are formed, and then raise the reaction temperature to 120° C. to complete the reaction. The product is a bead polystyrene having a melt index of 23.5 g./10 min. at 200° C. and 5 kg.

Example I

Repeat Control A except for adding 0.02 part of iron powder (100 mesh) to the reaction mixture before commencing the polymerization. The product is a bead polystyrene having a melt index of 7.5 g./10 min. at 200° C. and 5 kg.

Example II

Repeat Example I except for employing 0.04 part of the iron powder. The product is a bead polystyrene having a melt index of 4.8 g./10 min. at 200° C. and 5 kg.

Example III

Prepare four bead polystyrenes by repeating Control A except for substituting t-butyl peracetate for the t-butyl percrotonate and adding, respectively, 0.01, 0.02, 0.04, and 1.0 part of iron powder (100 mesh) to the reaction mixtures before commencing polymerization. The products have respective melt indices of 6.9, 5.4, 4.4, and 2.9 g./10 min. at 200° C. and 5 kg.

Example IV

Charge a suitable reaction vessel with 108 parts of water, 0.07 part of polyvinyl alcohol, 100 parts of styrene, 1.6 parts of tetrabromocyclooctane, 0.24 part of benzoyl peroxide, 0.03 part of t-butyl peracetate, and 0.03 part of powdered iron (100 mesh). Heat the reaction mixture to 92° C. and maintain it at 92° C. for 7 hours. Then add 9.7 parts of n-pentane. Raise the temperature to 120° C. and maintain the temperature at 120° C. for three hours. The product is a bead polystyrene having a melt index of 6.0 g./10 min. at 200° C. and 5 kg.

Prefoam the beads and mold the prefoam into a 2 ft. x 2 ft. x 3 ft. block. The total collapse of the block is only ½ in.

CONTROL B

Repeat Example IV except for adding no iron to the reaction mixture. The foamed block exhibits a collapse of 2 in.

It is obvious that many variations may be made in the products and processes set forth above without departing from the spirit and scope of this invention.

What is claimed is:

1. In a process for polymerizing at least one vinylidene monomer in the presence of a halogenated flame retardant, the improvement which comprises lowering the melt index of the product by conducting the polymerization in the presence of about 0.001–2% of finely-divided metallic iron, based on the weight of the monomer.

2. The process of claim 1 wherein the polymerization is conducted in aqueous suspension.

3. The process of claim 2 wherein at least the final stage of the polymerization is conducted in the presence of a volatile blowing agent.

4. The process of claim 1 wherein the vinylidene monomer is styrene.

5. The process of claim 1 wherein the halogenated flame retardant is a brominated polymer of butadiene or isoprene having a degree of polymerization of 2–2000.

6. The process of claim 5 wherein the halogenated flame retardant is a brominated cyclic dimer or trimer of butadiene.

7. The process of claim 1 wherein the amount of iron employed is about 0.015–1.5%.

8. The process of claim 7 wherein the amount of iron employed is about 0.03–0.06%.

9. In a process for polymerizing styrene in aqueous suspension in the presence of a suspending agent, a free radical polymerization initiator, and, based on the weight of styrene, about 1–5% of a brominated cyclic dimer or trimer of butadiene, wherein at least the final 2% of the polymerization is conducted in the presence of a volatile blowing agent; the improvement which comprises lowering the melt index of the product by conducting the polymerization in the presence of about 0.03–0.06% of finely-divided metallic iron, based on the weight of styrene.

10. In a process for preparing foamed polystyrene by (A) polymerizing styrene in aqueous suspension in the presence of a suspending agent, a free radical polymerization initiator, and based on the weight of styrene, about 1–5% of a brominated cyclic dimer or trimer of butadiene, wherein at least the final 2% of the polymerization is conducted in the presence of a volatile blowing agent, (B) heating the foamable particles thus prepared to form a prefoam, and (C) treating the prefoam with steam in a mold to form a shaped article; the improvement which comprises improving the dimensional stability of the foam by conducting the polymerization step in the presence of about 0.03–0.06% of finely-divided metallic iron, based on the weight of styrene.

References Cited
UNITED STATES PATENTS

| | | | |
|---|---|---|---|
| 3,049,522 | 8/1962 | Lowell et al. | 260—93.5 W |
| 3,326,832 | 6/1967 | Rauschenbach et al. | 260—2.5 FP |
| 3,093,599 | 6/1963 | Mueller-Tamm et al. | 260—2.5 FP |

SAMUEL H. BLECH, Primary Examiner

M. FOELAK, Assistant Examiner

U.S. Cl. X.R.

260—45.7 R, 45.75 R, 84.1, 878, 879, 880 R, 885, 93.5 R, DIG. 24